United States Patent [19]

Maier

[11] 4,209,872
[45] Jul. 1, 1980

[54] CLEANING IMPLEMENT

[75] Inventor: Siegfried Maier, Leinfelden-Echterdingen, Fed. Rep. of Germany

[73] Assignee: Düpro AG, Romanshorn, Switzerland

[21] Appl. No.: 919,941

[22] Filed: Jun. 28, 1978

[30] Foreign Application Priority Data

Jun. 28, 1977 [DE] Fed. Rep. of Germany ....... 2728992

[51] Int. Cl.² .................. A46B 15/00; F16C 35/00
[52] U.S. Cl. .................................. 15/179; 308/26
[58] Field of Search .................. 15/179–183, 15/392; 308/26; 29/123; 403/76

[56] References Cited

U.S. PATENT DOCUMENTS

| 2,176,769 | 10/1939 | Martinet | 15/392 X |
|---|---|---|---|
| 2,227,971 | 1/1941 | Holm-Hansen | 308/26 X |
| 2,657,418 | 11/1953 | Howard | 15/392 |
| 2,717,792 | 9/1955 | Pelley | 308/26 |
| 3,225,374 | 12/1965 | Daley et al. | 15/183 |
| 3,282,602 | 11/1966 | Willingshofer et al. | 403/76 X |
| 3,325,849 | 6/1967 | Waters | 15/179 X |
| 3,737,937 | 6/1973 | Nordeen | 15/182 |

Primary Examiner—John M. Jillions
Attorney, Agent, or Firm—Becker & Becker, Inc.

[57] ABSTRACT

A cleaning element, particularly a brush for incorporation in a vacuum cleaner nozzle, has a shaft with bristles which shaft has its ends journalled in the housing of a cleaning implement by means of bearings and shock absorbers. In order to give a compact construction and to reduce the spacing between the ends of the shaft and the side walls of the implement housing, the bearings with bearing housings project into openings in the ends of the shaft.

22 Claims, 4 Drawing Figures

CLEANING IMPLEMENT

This invention relates to a cleaning implement and, more particularly, to a brush for incorporation in a vacuum cleaner nozzle. This implement broadly comprises a shaft which is provided with bristles and at each end has a bearing which is sealingly connected to the shaft and is arranged in a bearing housing which rests with a shock absorber in a holder of a housing for said implement.

With a known cleaning implement of this kind, the sliding bearing is arranged outside the shaft on an associated end face so that the distance between the associated end of the bristle arrangement and the adjacent housing wall is relatively long. As a result, the housing is relatively long, which has an unfavorable effect on the handling, packing and storage of the implement. The main disadvantage of the long distance consists in that no cleaning action can be carried out by the implement in the area between the end of the bristle arrangement and the opposite housing wall. This may result in uncleaned marginal strips being left, for example along walls, cupboards or the like.

It is, therefore, an object of the invention so to design a cleaning implement of the above mentioned general type that the distance between the end of the bristle arrangement and the opposite housing wall can be kept relatively short.

This object and other objects and advantages of the invention will appear more clearly from the following specification in connection with the accompanying drawings, in which.

The cleaning implement according to the invention is characterized primarily in that the bearing for said bristle carrying shaft projects, with the bearing housing, at least partially into an associated bearing opening of the associated end of the shaft.

With the arrangement of the invention, the distance between the end of the bristle arrangement and the opposite housing will be shorter by at least approximately the axial extension of the sliding bearing than is the case with heretofore known implements of the type involved so that the marginal strip left uncleaned during cleaning is negligible.

Furthermore, the overall length of the cleaning implement will be relatively short and, therefore, the implement can easily be handled and stored in a small space and packed in a small package therby reducing packing costs.

Figure 4:
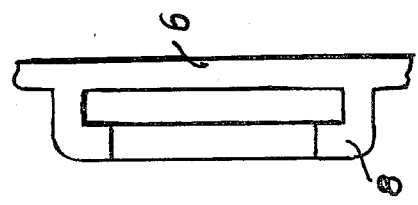
FIG. 4 is a view in the direction of the arrow "A" of FIG. 2.
Figure 2:
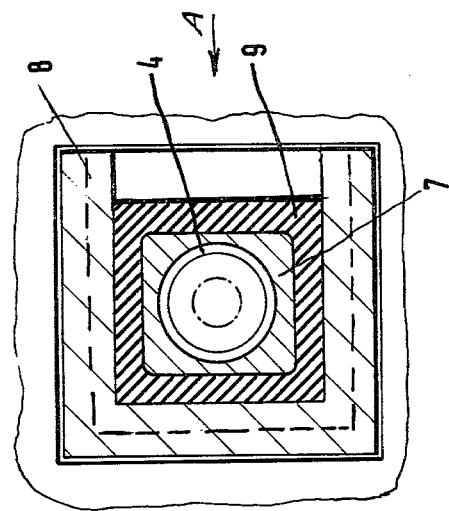
FIG. 2 is a section along the line A-B of FIG. 1.
Figure 1:
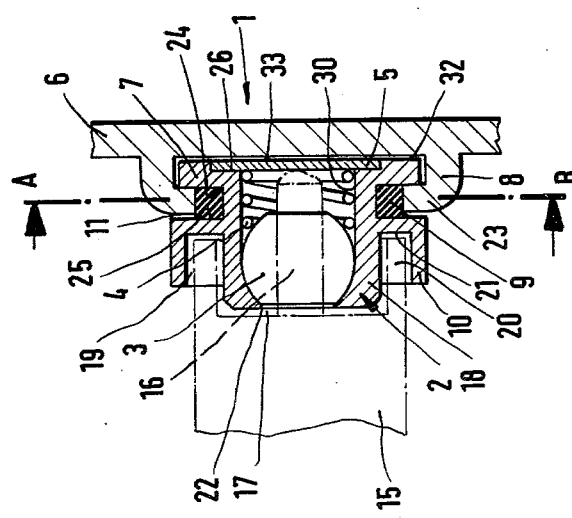
FIG. 1 is a longitudinal section through part of one form of a cleaning implement according to the invention.

Referring now to the drawings in detail, FIGS. 1 and 2 show part of a vacuum cleaner nozzle having a housing 6 (shown only in part) in which a shaft 15 is at its two ends (one end only being shown) rotatably supported by means of bearings. The bearings are identical at each end, and each bearing comprises a spherical segment-shaped sliding bearing 3 mounted on an associated axle stub 16 of the shaft 15 and accommodated in a bearing housing 1. In order to keep the distance between the free end of the shaft 15 and the housing 6 as short as possible, the free ends of the bristly carrying shaft 15 have the end faces provided with bearing openings of rectangular cross section, into which the sliding bearings 3 are inserted substantially over their entire height with a sleeve-shaped adapter 2 of the sliding bearing 3.

The sleeve-shaped adapter 2 extends substantially over the entire length of the axle stub 16 carrying the sliding bearing 3 and is of constant rectangular cross section over its entire height. The cross section is slightly smaller than the inside diameter of the bearing opening 17, so that the sleeve is located in the bearing opening with slight play. The sleeve 2 comprises a cylindrical internal bore 30 which, at its end 18 projecting into the bearing opening 17, tapers in cross section in a limb-shaped manner in accordance with the surface area of the sliding bearing 3. The end 18 extends to approximately half the height of the sliding bearing 3. Due to this design, the bristle shaft is perfectly aligned with the bearing housing 1 and the housing 6 of the vacuum cleaner nozzle respectively. Approximately at half its height, the sleeve 2 comprises a circular widened portion or flange 10 which defines a circular groove 19 for the edge or flange 20 of the bearing opening 17. The widened portion 10 is formed by a circular extension which projects from the end 18 of the sleeve 2 in the shape of an L in cross section. The edge or flange 20 is located over more than half its length, preferably over approximately two thirds of its length, and with all-round play in the groove 19, so that there is formed a kind of labyrinth seal, which in a simple manner prevents the bearings from being contaminated. The distance between the bottom 21 of the groove 19 and that end face 22 of the sleeve 2, which is located in the bearing opening 17, is approximately equal to the depth of the bearing opening 17.

The other end face of the sleeve 2 is formed by an edge or flange 7 which is located outside the bearing opening 17 and is angled towards the outside at right angles and is normal to the axis of the sleeve 2. The flange 7 has a rectangular contour which is slightly smaller than the contour of the sleeve 2 in the area of the groove 19. The holder 8 of the vacuum cleaner housing nozzle engages behind the edge of the flange 7.

The holder 8 has a plug-in opening which is U-shaped in cross section and into which the bearing part 1 is inserted with its flange 7 for fastening. The holder 8 comprises an arm which is vertical in the inner surface of the housing 6 and whose free ends 23 are angled substantially at right angles in the direction of each other. The holder 8 projects with its free ends 23 into a U-shaped groove 11 which is bounded by the inner surface 24 of the flange 7 and the opposite outer surface 25 of the widened portion 10. In order to prevent any shocks and vibrations, to which the bristle shaft 15 is subjected when moving over the floor surface, being transmitted to the housing 6, there is arranged in the groove 11 an annular shock absorber 9, against whose surface area the end faces of the free ends 23 of the holder 8 rest over the entire surface. The ring 9 comprises a soft-elastic material, such as rubber.

In order to ensure that the sliding bearing 3 rests satisfactorily against the cap-shaped inner surface of the sleeve 2 when the implement is operated, between the sliding bearing 3 and a closing plate 5 provided in the area of the flange 7, there is arranged a compression spring 4 which is coaxial with the axle stub or extension 16. The closing plate 5 has a rectangular, circular, or square contour and is interlocked in a shoulder-shaped recess 26 of the flange 7. The outer surfaces 32 and 33 of the flange 7 and of the closing plate 5 respectively are located in a common plane.

In order to prevent any damage to the walls of the bearing openings 17, the outer edges of the sleeves are bevelled.

Figure 3:
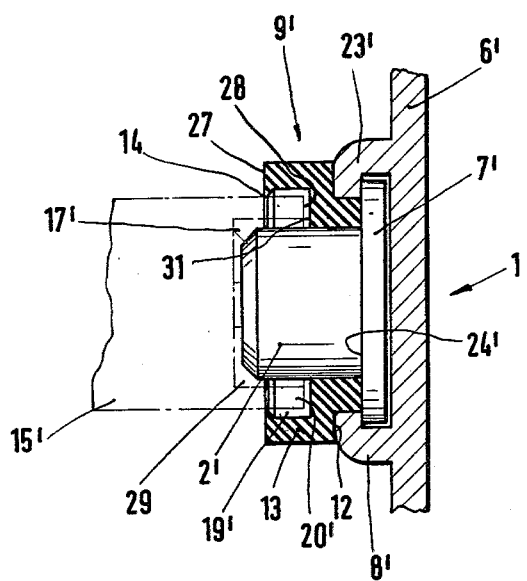
FIG. 3 is partly a longitudinal section and partly a plan view of part of a further form of a cleaning implement according to the invention.

With the vacuum cleaner nozzle shown in FIG. 3, the edge 20' of the bearing opening 17' is located in an end face recess 19' of a sleeve-shaped shock absorber 9' having a Z-shaped cross section. At its end face 27 that is directed towards the bristle shaft 15', the shock absorber 9' has one or several sealing lips 14 which project into the clear cross section of the recess 19' and rest under slight pre-load against the outer surface of the edge 20' of the shaft 15'. In this way, the bearing is highly protected from damage due to soiling. The axial extension of the shock absorber 9' is slightly less than that of the sleeve-shaped adapter 2'; with its end face 28 that is remote from the sealing lips 14, the shock absorber 9' rests against the inner surface 24' of the flange 7'. Between the section 13 of the shock absorber 9' comprising the recess 19' and the flange 7', the shock absorber comprises a circular groove 12 positively engaged by the bent ends 23' of the holder 8'. Like the shock absorber 9 shown in FIGS. 1 and 2, the shock absorber 9' comprises a soft-elastic material such as rubber. In order to increase the slidability of the sealing lips 14, the basic material of the shock absorber 9' contains a lubricant. In the area between the bottom 31 of the recess 19' of the shock absorber 9' and the end face 28 of the shaft 15', there exists only a small gap.

The bristles on the shaft 15 or 15' extend to within a very short distance from the bearing element 1 or the shock absorber 9', so that the area between the end of the bristles and the adjacent housing wall which area is not cleaned is very narrow.

It is, of course, to be understood that the present invention is, by no means, limited to the specific showing in the drawings but also encompasses any modifications within the scope of the appended claims.

What I claim is:

1. A cleaning implement which includes: a rotatable shaft provided with bristles and having each of its ends provided with a flange projecting in the axial direction of said shaft and defining a recess, said shaft having each end thereof provided with an axle stub coaxial with said shaft and extending through the pertaining recess and projecting therefrom, bearing means each including a bearing housing having an outer surface and being at least partially nested in the pertaining recess and journalling the respective adjacent axle stub, supporting means respectively supporting said bearing means, and shock absorbing means respectively interposed between each bearing housing and the pertaining supporting means, each of said bearing means including a ball-shaped member with oppositely located flat sides perpendicular to the axis of the pertaining axle stub which extends through said ball-shaped member while permitting rotation of said shaft, a spring in each of said bearing housings, and in which each ball-shaped members is arranged in the pertaining bearing housing so as to be adjustable against the force of the pertaining spring, each spring being interposed between the pertaining ball-shaped members and the pertaining supporting means, at least in the area of that end of said bearing housing that projects into the respective pertaining recess of said shaft the inner wall of said bearing housing is at least partially curved in conformity with the surface area of the pertaining ball-shaped member, the outer surface of the bearing housing at each end of said shaft being provided with a first groove having at least the major portion of the respective adjacent shaft flange located therein.

2. A cleaning implement which includes: a rotatable shaft provided with bristles and having each of its ends provided with a flange projecting in the axial direction of said shaft and defining a recess, said shaft having each end thereof provided with an axle stub coaxial with said shaft and extending through the pertaining recess and projecting therefrom, bearing means each including a bearing housing having an outer surface and being at least partially nexted in the pertaining recess and journalling the respective adjacent axle stub, supporting means respectively supporting said bearing means, and shock absorbing means respectively interposed between each bearing housing and the pertaining supporting means, the outer surface of the bearing housing at each end of said shaft being provided with a first groove having at least the major portion of the respective adjacent shaft flange located therein, said bearing housing having its outer surface provided with an additional groove and a shock absorber located in said additional groove.

3. A cleaning implement according to claim 2, in which each first groove has a U-shaped cross section.

4. A cleaning implement according to claim 2, in which said first groove is formed by a member of L-shaped cross section.

5. A cleaning implement according to claim 2, in which the flange on each end of said shaft is with play located in the pertaining first groove.

6. A cleaning implement according to claim 2, in which the distance of the bottom of each first groove from that end of the pertaining bearing housing which is located in the recess of the pertaining shaft end approximately equals the depth of the pertaining recess in said shaft.

7. A cleaning implement according to claim 2, in which that portion of said bearing housing means which is nested in the pertaining recess of said shaft is nested therein with play.

8. A cleaning implement according to claim 2, in which the flanges of said shaft respectively project into the pertaining first groove of the pertaining bearing housing as far as approximately the level of its bristles.

9. A cleaning implement according to claim 2, in which said additional groove is defined by a wall portion of said first groove and by a wall portion forming a flange extending radially outwardly from said bearing housing, said additional groove being engaged and supported by said supporting means.

10. A cleaning implement according to claim 9, in which the outer contour of said radially outwardly extending flange is substantially similar to the outer contour of the bearing housing within the region of said grooves respectively receiving said flanges.

11. A cleaning implement according to claim 9, in which said supporting means is provided with means for holding the radially outwardly extending flange, said holding means comprising an arm extending into said additional groove and engaging said shock absorbing means.

12. A cleaning implement according to claim 2, in which each end of said bearing housings is remote from the respective adjacent shaft end and has a radially outwardly extending flange defining an opening, and in which a closure plate is arranged between said last mentioned flange and the pertaining housing means while a loaded spring is located between said closure plate and the pertaining bearing means.

13. A cleaning implement according to claim 2, in which said shock absorber means is designed as a ring located in said additional groove.

14. A cleaning implement according to claim 13, in which said ring has a rectangular cross section.

15. A cleaning implement according to claim 2, in which said shock absorbing means forms a sleeve of Z-shaped cross section, said sleeve defining a portion of said first groove and also defining a portion of said additional groove.

16. A cleaning implement according to claim 15, in which said shock absorbing means rests against said bearing housing between said radially outwardly extending flange and said first groove.

17. A cleaning implement according to claim 15, in which said supporting means has an arm angled off toward the axis of said bearing housing and engaging said shock absorbing means.

18. A cleaning implement according to claim 15, in which that end face of said shock absorbing means which is closest to the pertaining shaft end is provided with at least one annular flexible sealing lip for engagement with the respective shaft flange.

19. A cleaning implement according to claim 18, in which in the area of said at least one sealing lip the inside width of the shock absorbing means is less than the outside diameter of said bearing housing.

20. A cleaning implement according to claim 2, in which said shock absorbing means is of an elastic material.

21. A cleaning implement according to claim 20, in which said elastic material is rubber material.

22. A cleaning implement according to claim 2, in which said shock absorbing means is detachably connected to said bearing housing.

* * * * *